United States Patent

Heise

[15] 3,678,692

[45] July 25, 1972

[54] PULSATION POWER UNIT

[72] Inventor: Georg Heise, Ailingen, Germany

[73] Assignee: Dornier A.G., Friedrichshafen/Badensee, Germany

[22] Filed: Sept. 14, 1970

[21] Appl. No.: 72,046

[30] Foreign Application Priority Data

Dec. 22, 1969 Germany ..................... P 19 64 226.3

[52] U.S. Cl. .............................................. 60/247, 60/271
[51] Int. Cl. ............................................................ F02k 7/04
[58] Field of Search ........................ 60/247, 39.77, 248, 249

[56] References Cited

UNITED STATES PATENTS

| | | | |
|---|---|---|---|
| 3,258,919 | 7/1966 | Klein | 60/39.77 |
| 2,834,181 | 5/1958 | Paris et al. | 60/247 |
| 2,924,071 | 2/1960 | Paravicini | 60/248 |
| 2,683,961 | 7/1954 | Britton et al. | 60/247 |
| 3,188,804 | 6/1965 | Melenric | 60/248 |
| 2,573,697 | 11/1951 | Dunbar et al. | 60/247 |
| 2,496,351 | 2/1950 | Mazzoni | 60/247 |

OTHER PUBLICATIONS

Nicholls et al.; Intermittent Detonation as a Thrust–Producing Mechanism: Jet propulsion, Vol. 27, No. 5, May, 1957, pp. 534–541.

Primary Examiner—Carlton R. Croyle
Assistant Examiner—Warren Olsen
Attorney—James E. Bryan

[57] ABSTRACT

This invention relates to an improvement in a pulsation power unit comprising an inlet, valve means, injection means, a combustion chamber and a combustion cowl, the improvement comprising additional cowl means of larger diameter at the end of the combustion cowl, said additional cowl means having a variable gas outlet cross-section.

8 Claims, 4 Drawing Figures

Patented July 25, 1972
3,678,692
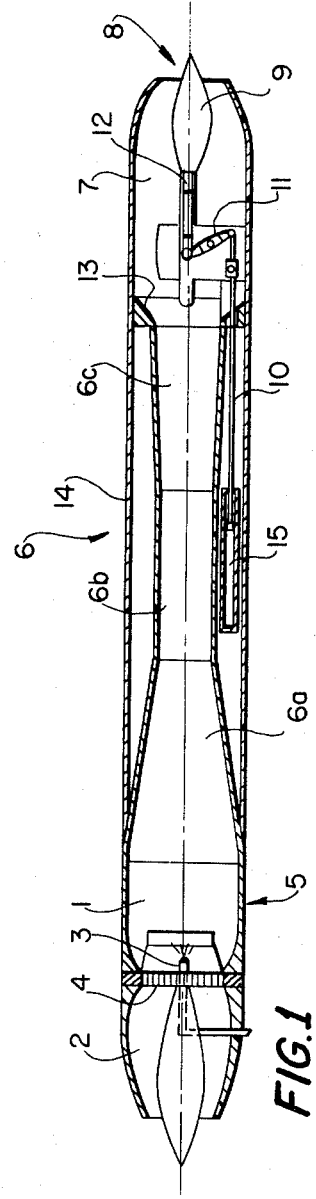
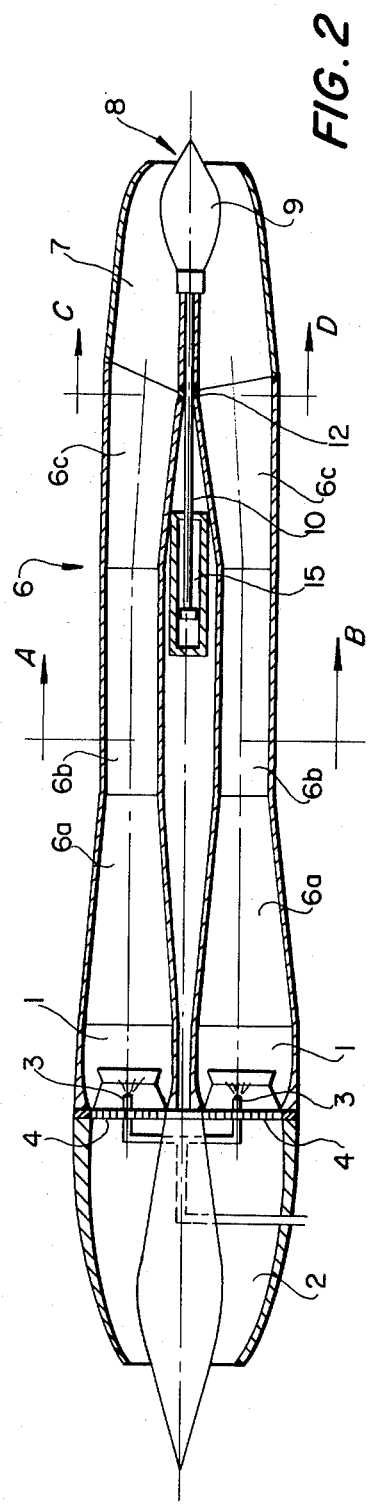
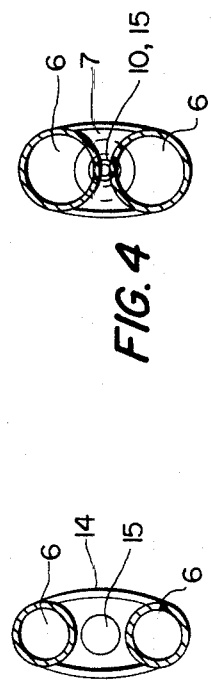
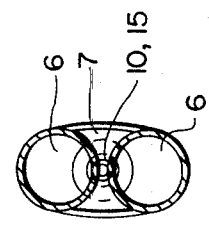
INVENTOR
GEORG HEISE
BY *James E. Bryan*
ATTORNEY

PULSATION POWER UNIT

The present invention relates to a pulsation power unit which is suitable for accelerating smaller aircraft, such as reconnaissance drones, target-representing and expendable aircraft, from the stationary position thereof to supersonic speed, and which comprises an intake, valves, injection means, combustion chamber, and combustion cowl or tube.

Prior art pulsation power units consist of a single cowl or tube the rear end of which is completely open and which is provided at the front end thereof with valves which may be either mechanical or aerodynamic relative to their nature. Due to the combustion taking place near the closed valves, a strong shock wave is produced which extends toward the open tube, or cowl, end and brings about the exhaust of the hot residual gases. This shock wave is reflected at the open combustion cowl or tube end as a strong low-pressure wave, which in turn extends or travels toward the valves, opening the same instantaneously, and produces the intake of ambient air to which fuel is admixed at the same time. The intake operation is completed by a compression wave following upon the low-pressure wave, with a steep compression front. This shock wave simultaneously causes — in an alternating effect with the residual flames still present within the combustion chamber — the ignition of the mixture within such a short period of time that almost constant-volume combustion is produced.

In order to assure that this process can be maintained, it is necessary that the compression waves discharging from the combustion cowl or flame tube are reflected with the opposite sign and at a sufficient intensity. This, however, is possible only if the combustion cowl or flame tube does not have a tapered end or a nozzle, respectively.

On the other hand, the existence of an open cowl or tube end has the result that the power unit is operative only up to relatively low subsonic speeds. This can be explained on the basis of the fact that the dynamic pressure ahead of the valves rises sharply with increasing flying speed, whereas the pressure at the open cowl or tube end is always approximately equal to the surrounding or ambient pressure. By reason of the increasing pressure ratio, the volume of the mixture being suctioned in per period increases until the cowl or tube is no longer operative starting from a specific flight mach number.

For the purpose of avoiding this speed limit it is known in the art to decrease the intake cross-section with increasing flying speed so that the volume of the mixture drawn in per period will not exceed the critical value thereof. It is readily apparent, however, that such an intake throttling involves at the same time a decrease in thrust so that already at very low flying speeds the point is thus reached where the thrust is equal to the resistance of the airframe, and a further acceleration is no longer possible.

It is further known to provide the outlet with an automatic control means which is opened by virtue of the combustion pressure and closed by means of spring action. Such a control means acts, however, upon the waves traveling toward the outlet like a closed cowl or flame tube end and like a nozzle so that neither the intake nor the ignition operations can proceed automatically, and so that accordingly the power unit is operative neither in stationary position nor in flight. As a result, pulsation power units are not usable to date for higher speeds, particularly speeds within the transonic or supersonic ranges.

The present invention provides a jet propulsion or power unit operating in a pulsating manner which comprises an intake, valves, injection means, combustion chamber, and combustion cowl; which is operative from the stationary position thereof up to the supersonic range, and whose net thrust increases with increasing flight mach number.

In accordance with the present invention, the end of the combustion cowl terminates in a widened portion, for example in a pipe having a larger cross-section, and whose gas outlet cross-section is variable. In order not to have to accept in exchange therefor, in this arrangement, any disadvantages with regard to the operation proper of the combustion cowl, a further embodiment of the present invention proposes a jump-like transition from the combustion cowl to the widened portion, and the cross-sectional surface of the widened portion has approximately twice the amount of the cross-sectional surface of the combustion cowl.

By virtue of this arrangement, the pulsation power unit is usable also in the transonic or in the supersonic ranges. The disadvantage of prior art pulsation power units, in that the power unit turns off automatically at a specific flow velocity, is effectively eliminated. The fact that no additional structural changes need be made in the pulsation power unit proper is a particular advantage afforded by the present invention.

The present invention will be further described hereinafter on the basis of the accompanying drawings, wherein FIG. 1 illustrates a pulsation power unit in a cross-sectional view thereof;

FIG. 2 illustrates a double cowl or double tube arrangement, and

FIGS. 3 and 4 are cross-sectional views taken along lines A–B and C–D, respectively, of FIG. 2.

FIG 1 illustrates a pulsation power unit in a cross-sectional view. Disposed ahead of the combustion chamber 1 is the air inlet 2; and valves, for example flap valves 4, between the combustion chamber 1 and the inlet 2 assure the pulsating operation. Positioned in the center of the flap valves 4, which are uniformly distributed over the cross-section of the air inlet 2 in known manner, is the injection device 3. An ignition device 5 for purposes of starting the power unit may be disposed at a place not further designated in the drawing. The combustion cowl 6 is attached to the other end of the combustion chamber 1 in the axial extension thereof. This combustion cowl consists of a transition member 6a, a combustion cowl center piece 6b, as well as the connecting piece 6c. The combustion cowl center piece 6b has a slightly smaller diameter than the combustion chamber 1. The transition member 6a compensates for the difference in diameters between the combustion chamber 1 and the combustion cowl center piece 6b. At the end of the combustion cowl center piece 6b, the connecting piece 6c is provided in a diffuser-like manner and secured to a widened portion 7 whose dimensions are adjusted to the combustion cowl 6. Mounted in the gas outlet of the widened portion 7 is a nozzle 8. In order to make possible a variation of the outlet opening of the nozzle 8, a jet needle or nozzle pin 9 is positioned in the center thereof, which needle is axially displaceable within the guide 12. The axial displaceability of the jet needle 9 serves for purposes of varying the final cross-section of the nozzle 8 at the desired moment. The jet needle 9 is hingedly connected with the end thereof at a lever 11 which latter is connected via a couple 10 with a displacing mechanism 15. The displacing mechanism 15 has been shown in the drawing as a type of hydraulic operating cylinder, in the interest of facilitating the understanding thereof. It is quite possible, of course, to achieve the movement of the couple with other displacing mechanisms. A casing 14 encloses the entire propulsion or power unit.

Disposed at the connecting point between the widened portion 7 and the connecting piece 6c is a cross-sectional jump or step 13, and the cross-sectional surface of the widened portion 7 is approximately twice that of the cross-sectional surface of the combustion cowl center piece 6b. The aforementioned cross-sectional jump or step 13 has the effect that the compression waves are reflected with the correct sign and at a sufficient intensity. The proportioning of the length of the widened portion 7 as compared to the length of the combustion cowl 6 has the effect that the waves being reflected at the nozzle 8 intensify the processes within the combustion cowl 6 in a manner such that, for example, a low-pressure wave traveling from the widened portion 7 into the combustion cowl 6 will intensify the shock wave, which latter is reflected as a low-pressure wave at the combustion cowl end, i.e. at the cross-sectional jump or step 13.

FIG. 2 illustrates a further embodiment of the pulsation power unit of the present invention. Shown in a cross-sectional view is the arrangement of a double cowl or tube in which two combustion chambers 1 are provided side by side with the respectively coordinated injection means 3 and flap valves 4. The air inlet 2, on the other hand, is common to both combustion cowls 6. Disposed at the end of the combustion cowls 6, which equally consist of the transition members 6a, the combustion cowl center pieces 6b, and the connecting pieces 6c, is the widened portion 7 as a single part. In order to keep the end face of the propulsion or power unit as small as possible in a simple manner, the air inlet 2 and the widened portion 7 are provided with an elliptical cross-section and the fairing 14 is matched thereto accordingly.

Such double flame tube or cowl arrangements are known and have the general advantage that both tubes operate automatically with a phase shift of 180°, as a result of which the flow from the nozzle becomes almost continuous, and so that accordingly also the exhaust noise is reduced considerably. The prior art arrangements have the common feature that the two combustion cowl or flame tube ends are directed against each other so that the hot gases must escape via the annular gap or clearance remaining between the two combustion cowl or tube ends into a collector space in order to be expanded from there by way of either a turbine wheel or a nozzle. The intention behind this arrangement is to avoid the occurrence of reactions from the nozzle to the operation of the combustion cowl or flame tube. The flow process from the combustion cowls or flame tubes through the annular gap or clearance into the collector space obviously involves considerable losses.

The arrangement illustrated in FIG. 2 does not involve this disadvantage by virtue of the fact that the ends of the combustion cowls of flame tubes are positioned therein side by side. The widened portion 7 is so provided and arranged with respect to the length and surface extension thereof that reactions from the common nozzle to the two tubes are effectively precluded. While these reactions or reactive effects are useful in a propulsion unit as illustrated in FIG. 1 with the proper design of the widened portion, they are definitely basically harmful, in the arrangement of two tubes or cowls, because of the phase shift of 180°, for one of the two tubes. If, for example, a compression wave is reflected at the common nozzle 8, it will reach the combustion cowl or flame tube ends at the moment when a compression wave is reflected in one of the cowls or tubes, but an expansion wave, because of the phase shift of 180°, is reflected in the other cowl, so that the former is indeed intensified, but the latter is reduced and totally neutralized. This disadvantage is effectively prevented by providing the surface extension of the nozzle 8 of the widened portion 7 approximately corresponding to a spherical zone.

FIGS. 3 and 4, the double tube is illustrated as viewed along lines A-B, and, respectively, C-D of FIG. 2. This has the purpose of showing in what distance the combustion cowls or flame tubes 6 are positioned, and how the fairing 14 appears in the cross-section thereof.

Installed between the two combustion cowls or flame tubes 6 is again the displacing mechanism 15 which, for example in FIG. 1, is arranged at the underside of the propulsion unit. It may, for example, eliminate the translation by way of the lever 11 in view of the fact that the jet needle or nozzle pin 9 is in direct operative engagement with the displacing mechanism. As a result thereof, the transmission of force from the displacing mechanism to the jet needle 9 is simplified.

When a pulsation power unit of this type is installed in an aircraft as mentioned hereinabove, the dynamic pressure ahead of the valves — and therewith the mass weight rate of flow — rises with increasing flying speed, whereby a higher pressure is again built up ahead of the nozzle, whereas — within the most narrow cross-section of the nozzle — external pressure will initially prevail. Hence, the nozzle pressure ratio will rise until the flow mach number within the most narrow cross-section has reached the value 1. Disregarding for a moment the minor variations due to the temperature-dependence of the specific heat, the nozzle pressure ratio remains constant from this moment on so that the pressure within the widened portion will vary in conformity with the dynamic flight pressure, and the operation proper of the combustion cowls or flame tubes becomes independent of the flying speed.

On the basis of the fact that the thrust of known pulsation power units will initially sharply rise with the flying speed — by reason of the increasing volume of the mixture — but decrease very markedly once the critical value has been reached, the change in the nozzle surface preferably should be made in a manner such that, precisely at the moment when the nozzle flow becomes critical, the volume of the mixture has reached the highest possible value thereof. At an increasing flying speed, the variation or change of the nozzle surface should be made — in dependence upon the flying condition and amount of fuel injected — preferably in a manner such that the volume of the mixture having been drawn in per period retains the optimal value thereof.

It will be obvious to those skilled in the art that many modifications may be made within the scope of the present invention without departing from the spirit thereof, and the invention includes all such modifications.

What is claimed is:

1. In a pulsation power unit comprising an inlet, valve means, injection means, combustion chamber and combustion cowl, the improvement which comprises additional cowl means of larger diameter at the end of the combustion cowl, step means between the combustion cowl and the additional cowl means, the cross-sectional surface of the additional cowl means having at least double the amount of the cross-sectional surface of the combustion cowl, the length of the additional cowl means being approximately one-third the length of the combustion cowl, and the additional cowl means having a variable gas outlet cross-section.

2. A power unit according to claim 1 including a displacing means for a jet needle positioned between the combustion cowls of the double cowl arrangement.

4. A power unit according to claim 2 including displacing means for a jet needle positioned between the combustion cowls of the double cowl arrangement.

4. A power unit according to claim 2 having a single air inlet and a single gas outlet.

5. A power unit according to claim 1 including axially displaceable jet needle means mounted in the outlet of the additional cowl means for purposes of varying the gas outlet cross-section.

6. A power unit according to claim 1 in which the surface extension of the outlet of the additional cowl means corresponds approximately to a spherical zone.

7. A power unit according to claim 1 in which the additional cowl means and the air inlet have elliptical cross-sections.

8. A power unit according to claim 1 including a displacing mechanism for a jet needle positioned between the combustion cowl and a fairing.

* * * * *

UNITED STATES PATENT OFFICE
CERTIFICATE OF CORRECTION

Patent No. 3,678,692      Dated July 25, 1972

Inventor(s) Georg Heise

It is certified that error appears in the above-identified patent and that said Letters Patent are hereby corrected as shown below:

[73] "Badensee" should read ---Bodensee---.

Column 3, line 49, insert ---In--- before "FIGS.".

Claim 2 should read as follows:

2.  A power unit according to claim 1 including a double combustion cowl having a common air inlet, the approximately parallel transition members of the double cowl terminating in a single additional cowl means.

The first claim numbered "4" should be number ---3---.

Signed and sealed this 9th day of January 1973.

(SEAL)
Attest:

EDWARD M. FLETCHER, JR.
Attesting Officer

ROBERT GOTTSCHALK
Commissioner of Patents